United States Patent Office 3,564,591
Patented Feb. 16, 1971

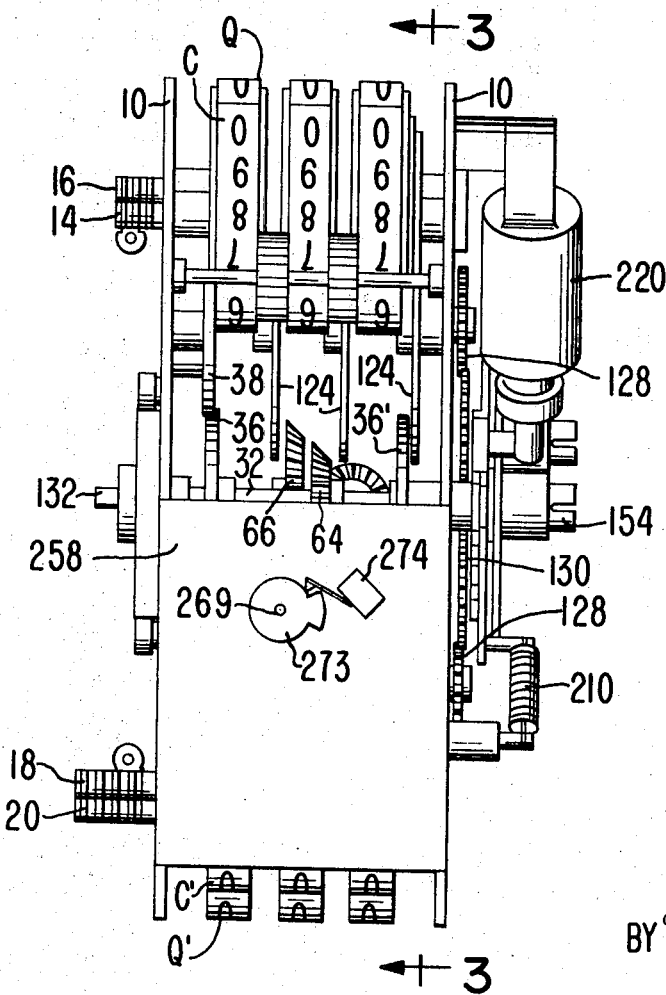

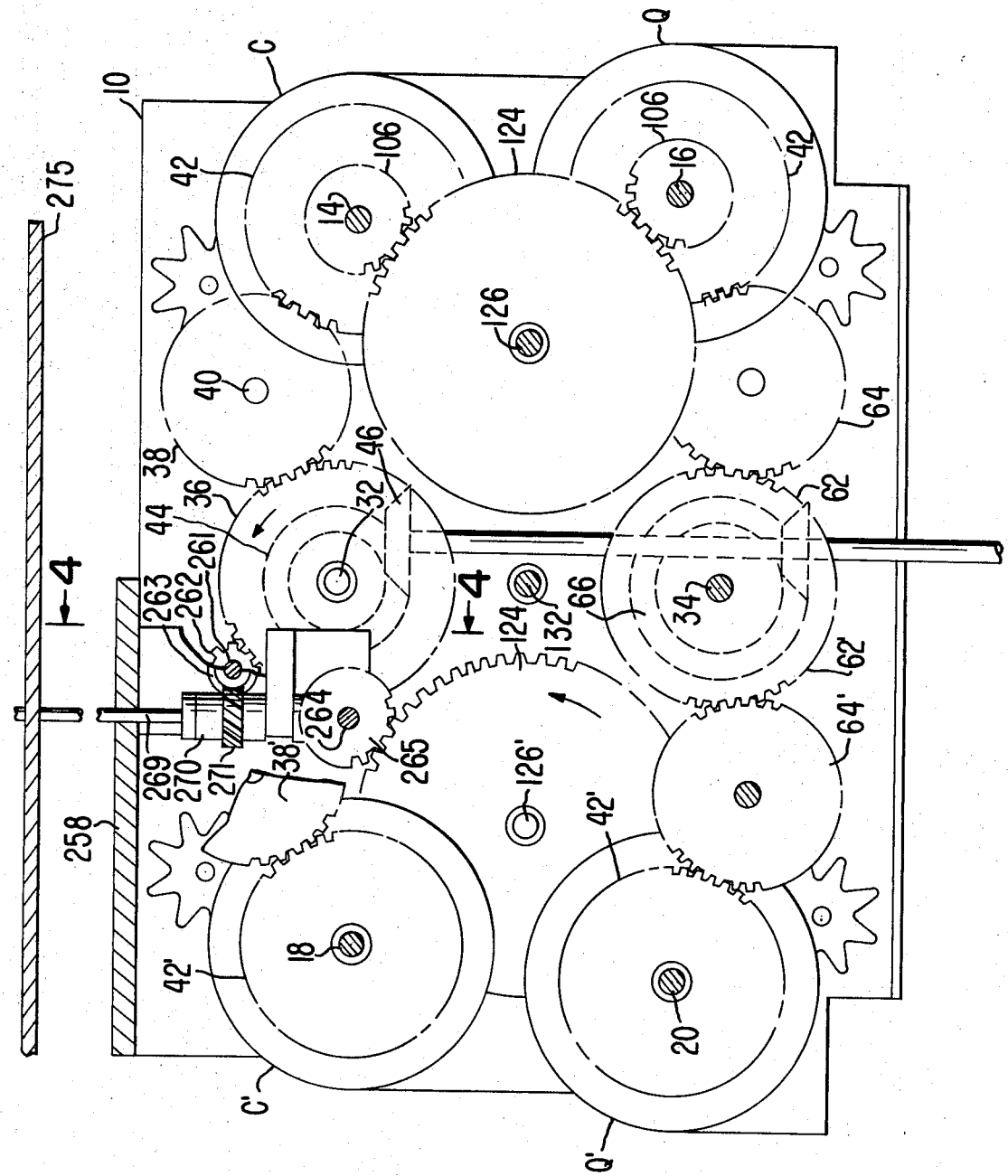

3,564,591
REGISTER AND ELECTRICAL SIGNAL GENERATOR APPARATUS
John B. Riddle, Los Altos Hills, and Frederick K. Tanaka, Hayward, Calif., assignors to Micro-Magnetic Industries, Inc., Palo Alto, Calif., a corporation of California
Filed July 23, 1969, Ser. No. 843,952
Int. Cl. G06c 15/42; B67d 5/26
U.S. Cl. 235—94
10 Claims

ABSTRACT OF THE DISCLOSURE

An electrical signal generator coupled to a mechanical register apparatus of a gasoline pump is disclosed. A set of number wheels for registering the cost of the gasoline is coupled to a driven gear train for rotating the number wheels during a counting operation and is decoupled from the driven gear train and coupled to a reset gear train for resetting the number wheels to zero during a reset operation. The signal generator comprises a rotatable shaft and a first gear means coupled to the driven gear train for rotating the main drive shaft during the counting operation. A second gear means coupled to the reset gear train rotates the shaft to a home position during the resetting operation.

BACKGROUND AND BRIEF SUMMARY OF INVENTION

The present invention relates in general to registers or counters useful, for example, in gasoline dispensing apparatus and, more particularly, to a register which incorporates a novel signal generator apparatus for producing an electrical signal in sychronization with the count of the register.

In present day gasoline pump dispensing mechanisms, a register is used to register both the quantity of liquid dispensed and the cost thereof. Many of the gasoline dispensing pumps located in gas stations throughout the United States utilize the register mechanism shown and described in U.S. Pat. No. 2,814,444 issued on Nov. 26, 1957 to Harvey N. Bliss and assigned to Veeder-Root, Inc. This register mechanism includes a group of number wheels which are utilized to register the quantity of the gasoline dispensed from the pump and a second group of number wheels which register the cost of the gasoline dispensed. The cost wheels are coupled to a speed change mechanism or variator, the variator being set in accordance with the particular existing price per gallon of the gasoline to produce the proper speed ratio between the cost wheels and the quantity wheels. The gasoline passes through a meter which is rotated thereby in an amount commensurate with the quantity of the gasoline being dispensed.

The meter is utilized to drive the quantity register directly while the drive to the cost register is through the variator which changes the speed of rotation in accordance with the price per gallon.

It is becoming more common for gasoline stations to be converted from attendant operated to some form of self service, or automatic, semiautomatic operation. As an example, a gasoline pump located outside of a grocery store may be converted so that the energization of the gasoline pump may be controlled by the storekeeper from within the store. When a customer indicates to the storekeeper that he desires to purchase a quantity of gasoline, the storekeeper activates the pump from within the store and the customer may then pump as much gas as he desires into his automobile. As the gas is pumped and both the quantity and price register on the counting mechanism within the gasoline pump, it is desired that a signal indicative of the cost of the gasoline also be transmitted to the storekeeper so that he may be advised of the proper amount to charge the customer. For this reason, it is desired that the gasoline pump register generate a signal in the form of an electrical pulse for each particular unit of gas dispensed, for example one pulse for one cent of gasoline, and transmit the total number of pulses to a register within the store which will give to the storekeeper the total price of the gasoline.

In those installations where a prepaid or credit status has been established for the customer before he commences to pump the gasoline, the power to the gasoline pump may be automatically terminated upon receipt of a sufficient number of electrical pulses at the control station which indicate that the customer's credit has been used up.

In any event, it is desired to generate electrical pulses from the mechanical counter in an accurate, efficient and inexpensive manner, while at the same time, because of the explosive nature of the gasoline being dispensed, it is necessary that the rules and regulations regarding the location of electrical apparatus in the vicinity of the gas pump be observed. Generally speaking, only electrical apparatus which is carefully sealed within an explosion proof casing may be employed within a specified distance of the gas conduits, meters, and pumps.

In many of the modern pump housings there is an electrical compartment on the top of the housing which accommodates electrical lights for the purpose of lighting signs on top of the pump. This electrical compartment is located at least 48 inches above the gasoline pump mechanism in accordance with the electrical code established for electrical connections within the vicinity of gasoline. Since the electrical wiring in the light compartment is a distance removed from the gasoline pump mechanism which is established by fire code as being safe, the wiring need not be enclosed in explosion proof casings or treated any differently than the established electrical code for electrical wiring in general. It is desired, therefore, that the electrical portion of the signal generator be positioned within the light compartment space of the gasoline pump housing so that it need conform only to the general regulations relating to electrical apparatus.

It is the object of the present invention to provide a novel electrical signal generating apparatus which is simple in nature, may be easily added to existing gasoline pumps without reconstruction, rebuilding, or expensive modifications to the pumps, and conforms to existing electrical and fire codes. Since a very large number of the existing gasoline dispensing pumps utilize the quantity and cost register of the cited patent, the signal generator apparatus of the present invention is adapted to couple directly to the register of the cited patent without change being made to the register, the coupling being such that the signal generator extends upwardly from the register and into the electrical lamp section of the gasoline pump on the top of the pump housing, the electrical portion of the signal generator being located in the lamp section and thus avoiding the requirement for an explosion proof casing.

An existing register such as described in the cited patent, includes an axially movable shaft on which the cost number wheels are rotatably mounted. A driven gear train rotates the number wheels during the dispensing of the gasoline to register the cost thereof and a resetting gear train is utilized to rotate the number wheels to zero when the register is being cleared. Means is provided for axially shifting the shaft to couple the number wheels selectively with the driven gear train during the registering operation and with the resetting gear train during the resetting operation.

The signal generating apparatus of the present invention includes a main drive shaft having a home position and an electrical switch operated in response to rotation of the main drive shaft to produce a pulse for each revolution of the shaft. The electrical switch is located a predetermined distance above the register so as to be within the light section of the pump housing.

A first gear means is coupled to said main drive shaft and to said driven gear train in the register for rotating the main drive shaft in synchronism with the number wheels during said counting operation. A second gear means is coupled to said main drive shaft and to said resetting gear train for rotating said main drive shaft to said home position when said number wheels are rotated to their zero position. A friction clutch in the second gear means permits the main drive shaft to rotate under control of the driven gear train during the registering operation, and a second friction clutch in the first gear means permits the main drive shaft to rotate under control of the reset gear train during the reset operation.

These and other features and advantages of the present invention will become more apparent from a perusal of the following specifications taken in connection with the drawings attached hereto.

BRIEF DESCRIPTION OF DRAWINGS

FIG. 1 is a front view partially broken away of a gasoline pump, said gasoline pump being modified to incorporate the novel signal generating apparatus in the present invention;

FIG. 2 is a top view of the register apparatus of the gasoline pump showing the signal generator coupled thereto;

FIG. 3 is a cross-sectional view of the register apparatus and signal generating unit taken through section line 3—3 of FIG. 2; and FIG. 4 is a cross-section view of the signal generating apparatus taken through section line 4—4 of FIG. 3.

DESCRIPTION OF PREFERRED EMBODIMENTS

The register mechanism which incorporates the present invention is fully shown and described in the above-cited U.S. Pat. No. 2,814,444 and only so much of that mechanism as is necessary to a full understanding of the present invention will be repeated herein. FIGS. 2 and 3 of the present application are views which are very similar to FIGS. 3 and 7, respectively, of the patent; those elements in the present application which are the same as elements in the cited patent are identified with the same reference numerals to aid in a ready understanding of the present invention. The numbering of the new elements of this application will commence when the reference numerals ended in the patent, i.e. number 254.

Referring now to FIG. 1 of the drawings there is shown in plan view the front portion of a gasoline pump of the type found in many gasoline stations. It comprises a pump nozzle 254 and a flexible hose 255 connected to the nozzle and to the gasoline pump and meter mechanism (not shown) in the bottom half of the pump. A drive shaft 256 extends from the meter mechanism up into the variator 28. The number wheels P are associated with the variator mechanism and indicate the price per gallon of the liquid being dispensed, the variator being set in accordance with such price to produce the proper speed ratio between the drives to the cost wheels C and quantity wheels Q respectively. The rotatable number wheels C register the cost of the gasoline dispensed and, in addition, the number wheels Q register the quantity of the gasoline dispensed. A reset mechanism is provided to return the quantity and cost wheels to their zero position.

The pump is provided with a handle 168 which, when rotated 90° in one direction, turns on the pump motor and also places the cost wheels and the quantity wheels in the registration position for registering the amounts in accordance with the gas dispensed. After the dispensing action has taken place, the operator turns the handle back to its normal position, turning off the pump and disengaging the registering wheels and engaging the reset mechanism so that the wheels C and Q may subsequently be returned to their zero setting by operation of the button 240 on the side of the pump.

The pump housing is provided with a light section 257 on the upper portion thereof this light section having a transparent front panel with a sign painted thereof, a light being located within the compartment and arranged to light up the sign on the front panel.

Referring to FIGS. 2 through 4 inclusive, the register is mounted on a frame including side plates 10 which carry four axially movable horizontal wheel supporting shafts 14, 16, 18 and 20. The shafts 14 and 18 have mounted thereon the sets of rotatable number wheels C while shafts 16 and 20 carry the sets of number wheels Q. The wheels carried by shafts 16 and 20 are duplicates of those carried by the shafts 14 and 18 so that the cost and quantity information may be read from both sides of the gasoline pump. An upper cross shaft 32 extends between the side plates 10 and carries gears 36 and 36' which mesh with idler gears 38 and 38'. The idler gears 38 and 38' mesh with the driven gears 42 and 42' which are connected to the two wheels of lowest order of the two separate sets of cost wheels. The shaft 32 has fixed thereto a beveled gear 44 which meshes with the bevel gear 46 mounted on one of the output shafts of the variator 28.

In operation, the bevel gear 46 is driven from the variator and in turn drives the bevel gear 44 in a counter-clockwise direction as viewed in FIG. 3. Rotation of the shaft 32 by bevel gear 44 drives gears 36 and 36' in a counter-clockwise direction as viewed in FIG. 3. Gears 36 and 36' drive idler gears 38 and 38', respectively, which in turn drive number wheels C and C' in a counter-clockwise direction via driven gears 42 and 42', respectively, to register the cost of the gasoline being metered through the pump. Another bevel gear 66 driven in accordance with the quantity of gas being dispensed drives to two gears 62 and 62' mounted on the cross shaft 34 which in turn drive the idler gears 64 and 64', respectively, driving gears 42 and 42' to rotate the gas quantity wheels Q and Q' in accordance with the amount of gasoline dispensed.

During the cost and quantity registering period of operation, gears 124 mounted on the shafts 126 and 126' remain stationary, the resetting gears 106 associated with the number wheels C, C', Q and Q' being disengaged from the wheels. After the gasoline has been dispensed, the pump is turned off by returning the handle 168 to its normal position, which also produces a shifting of the wheel-supporting shafts 14, 16, 18 and 20 axially to disengage the number wheels from their respective driven gears 42 and 42' and to couple the number wheels to the resetting gears 106. The spur gear 130 is rotated under the control of the operator-activated reset drive mechanism, including coupling 154, drive spring 210, and speed control dashpot 220, and drive pinions 128. Pinions 128 are mounted on the ends of shafts 126, 126' and thus rotate the gears 124, which drive gears 106 and rotate the cost and quantity wheels C, C', Q and Q' to their zero position as more fully described in the cited patent. After the wheels have been reset to their zero position, the shafts 14, 16, 18 and 20 shift axially back to their register position and couple to the driven gears 42, 42'.

The signal generator of the present invention is adapted to be driven in synchronism with the cost drive mechanism of the register apparatus. The signal generator apparatus comprises a mounting plate 258 adapted to be fixedly secured to the top of the two register side plates 10. The mounting plate 258 carries a pair of vertical support plates 259, 260 extending down from the mounting plate. The two vertical support plates carry a rotatable horizontally-extending shaft 261 which carries on its end a driven gear 262 and in its center carries a worm gear 263, both gears being fixedly secured to the shaft. A second shaft 264 is rotatably supported between the two support plates, the second shaft carrying a driven gear 265 which meshes with reset gear 124, a friction clutch 266 and a bevel gear 267.

Both the bevel gear 267 and the right-hand section 261 of the friction clutch 266, as viewed in FIG. 4, are affixed to the shaft 264, the driven gear 265 being affixed to the left-hand section of the friction clutch. The shaft 264 may rotate relative to the gear 265 in the clockwise direction as viewed in FIG. 3 due to the friction coupling to the clutch 266.

A cross-piece support plate 268 extends between the two vertical support plates 259, 260. A main drive shaft 269 is rotatably mounted in the cross-piece support, the drive shaft carrying a friction clutch 270, a worm gear 71 meshing with the worm gear 263 on the shaft 261, and a bevel gear 272 meshing with the driven bevel gear 267 on the shaft 264. The bevel gear 272 and the top section of the friction clutch 270 are affixed to the shaft 269, whereas the worm gear 271 is affixed to the bottom section of the friction clutch and is thus rotatably coupled to the shaft.

In operation, as the gear 36 rotates in a counter-clockwise direction as viewed in FIG. 3 in accordance with the cost of the gasoline being dispensed, it drives the driven gear 262 in a clockwise direction which in turn drives the worm gears 263 and 271 to rotate the main shaft 269 of the signal generator in a clockwise direction as viewed in FIG. 2. The gear ratios are so adjusted that the main shaft 269 of the signal generator rotates one revolution for each one cent of gasoline dispensed. During this period, the gear 265 is held stationary by the reset gear 124, the friction clutch 266 permitting the shaft 264 and bevel gear 267 to rotate as gear 267 rotates.

A cam 273 is mounted on the upper end of the shaft 269, the cam being adapted to close an electrical switch 274 during the last quarter of each revolution to thereby generate an electrical pulse for each one cent of gasoline dispensed. The switch 274 is located above the base plate 275 which forms the floor of the light section 257 of the pump housing. The generated pulses are transmitted to a remote register 276 for recording the price of the gasoline dispensed.

Other switch means could be utilized in lieu of the cam 273 and switch 274, such as, for example, a magnetically operated switch controlled from a small magnet rotating on the shaft 269 or a rotating photo-optic switch mechanism.

It is desirable that the cam 273 be returned to the home position shown in FIG. 2 after each dispensing operation. This will insure that the series of electrical pulses generated for the next customer will begin at the beginning of the dispensing operation of the gasoline and not at some mid-point period in the first one cent cycle. The cam 273 is returned to its normal or home position at the same time that the gasoline pump register is reset to zero. When the reset mechanism of the register is operated to return the cost wheels C and C' and the quantity wheels Q and Q' to their zero position, gear 124 rotates counter-clockwise as viewed in FIG. 3 and drives gear 265 in a clockwise direction. The bevel gear 272 is provided with a flattened or toothless section in its gear surface which occurs at the point aligned with the bevel gear 267 when the cam 273 is in its home position. Should the cam 273 be in its home position when the reset operation takes place, gears 265 and 267 will rotate but, since the flat or toothless portion of the bevel gear 272 is aligned with the bevel gear 267 the shaft 269 will remain stationary. However, if the cam 273 is not in its home position, teeth in bevel gear 267 will be meshing with teeth in bevel gear 272 and the bevel gear 272 and shaft 269 will rotate with gear 265 and bevel gear 267 until the cam 273 reaches its home position, at which time bevel gear 267 will encounter the flattened or toothless section of the bevel gear 272 and the shaft 269 and the bevel gear 272 will cease to rotate, leaving cam 273 in the home position.

During this reset operation, gears 262, 263, and 271 are held stationary by the gear 36, the friction clutch 270 permitting rotation of the shaft 269 by the bevel gear 272.

What is claimed is:

1. A register and electrical signal generator comprising an axially movable shaft, a number wheel, a driven gear train for rotating the number wheel during a counting operation, a resetting gear train for rotating the number wheel to zero, means for coupling the number wheel selectively with the driven gear train and the resetting gear train, means for driving the driven gear train when the number wheel is coupled thereto, means for driving the resetting gear train when the number wheel is coupled thereto, a signal generator including a main drive shaft having a home position, an electrical switch operated in response to rotation of said main drive shaft, first gear means coupled to said main drive shaft and said driven gear train for rotating said main drive shaft in synchronism with said number wheel during said counting operation, and a second gear means coupled to said main drive shaft and said resetting gear train for rotating said main drive shaft to said home position when said number wheel is rotated to zero.

2. A register and electrical signal generator as claimed in claim 1 wherein said first gear means is coupled to said main drive shaft through a friction clutch.

3. A register and electrical signal generator as claimed in claim 2 wherein said second gear means is coupled to said main drive shaft through a second friction clutch.

4. A register and electrical signal generator as claimed in claim 1 wherein said second gear means includes a first bevel gear coupled to said main drive shaft and a second bevel gear coupled to said resetting gear train and meshing with said first bevel gear.

5. A register and electrical signal generator as claimed in claim 4 wherein one of said bevel gears has a section bare of teeth, the home position of said main drive shaft occurring where the bare section of said one bevel gear aligns with the other bevel gear.

6. Gasoline pump register apparatus including an axially movable shaft, a number wheel rotatably mounted on the shaft, a driven gear train for rotating the number wheel during the dispensing operation of the gasoline pump, a resetting gear train for rotating the number wheel to zero, means for axially shifting said shaft for coupling the number wheel selectively with the driven gear train and the resetting gear train, means for driving the driven gear train when the number wheel is coupled thereto, means for driving the resetting gear train when the number wheel is coupled thereto, the improvement comprising an electrical pulse generator for coupling to said gasoline register comprising a main drive shaft having a home position, an electrical switch operated in response to rotation of said main drive shaft, a first gear means in said signal generator for coupling to said driven gear train in said register and to said main drive shaft for rotating said main drive shaft in synchronism with said number wheel during said gasoline dispensing operation to produce electrical pulses proportional to the gasoline dispensed, and a second gear means in said signal generator for coupling to said resetting gear train and to said main drive shaft for rotating said main drive shaft to said home position during the resetting operation when said number wheel is rotated to zero.

7. A gasoline pump register apparatus as claimed in claim 6 wherein said first gear means is coupled to said main drive shaft through a friction clutch.

8. A gasoline pump register apparatus as claimed in claim 7 wherein said second gear means is coupled to said main drive shaft through a second friction clutch.

9. A gasoline pump register apparatus as claimed in claim 8 wherein said second gear means includes a first bevel gear coupled to said main drive shaft and a second bevel gear coupled to said resetting gear train and meshing with said first bevel gear.

10. A gasoline pump register apparatus as claimed in claim 9 wherein one of said bevel gears has a section bare of teeth, the home position of said main drive shaft occurring where the bare section of said one bevel gear aligns with the other bevel gear.

References Cited

UNITED STATES PATENTS

| | | | |
|---|---|---|---|
| 2,553,842 | 5/1951 | Bickel et al. | 235—91 |
| 2,814,444 | 11/1957 | Bliss | 235—94 |
| 2,823,276 | 2/1958 | Bibb, Jr. et al. | 200—30 |
| 3,100,062 | 8/1963 | Spalding | 222—35 |
| 3,231,135 | 1/1966 | Starbuck et al. | 222—26 |
| 3,344,986 | 10/1967 | Stasenko et al. | 235—94 |

STEPHEN J. TOMSKY, Primary Examiner

U.S. Cl. X.R.

235—61, 144